Nov. 13, 1928.
T. HALL
1,691,475
PROJECTOR LAMP
Filed Jan. 18, 1928
2 Sheets-Sheet 1
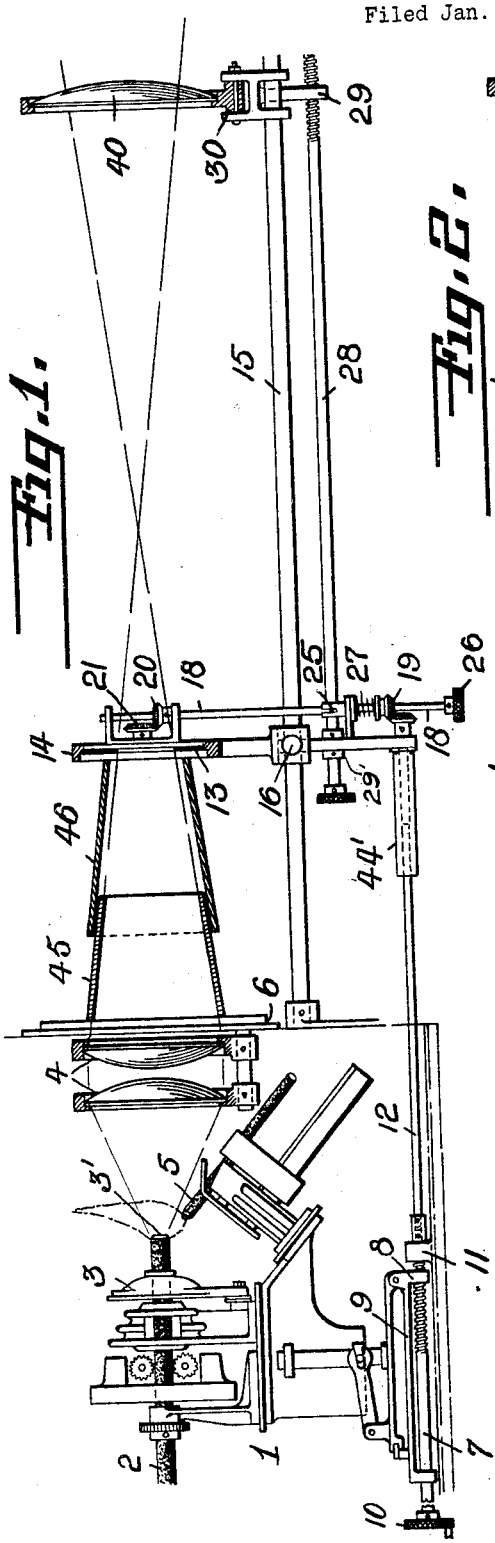
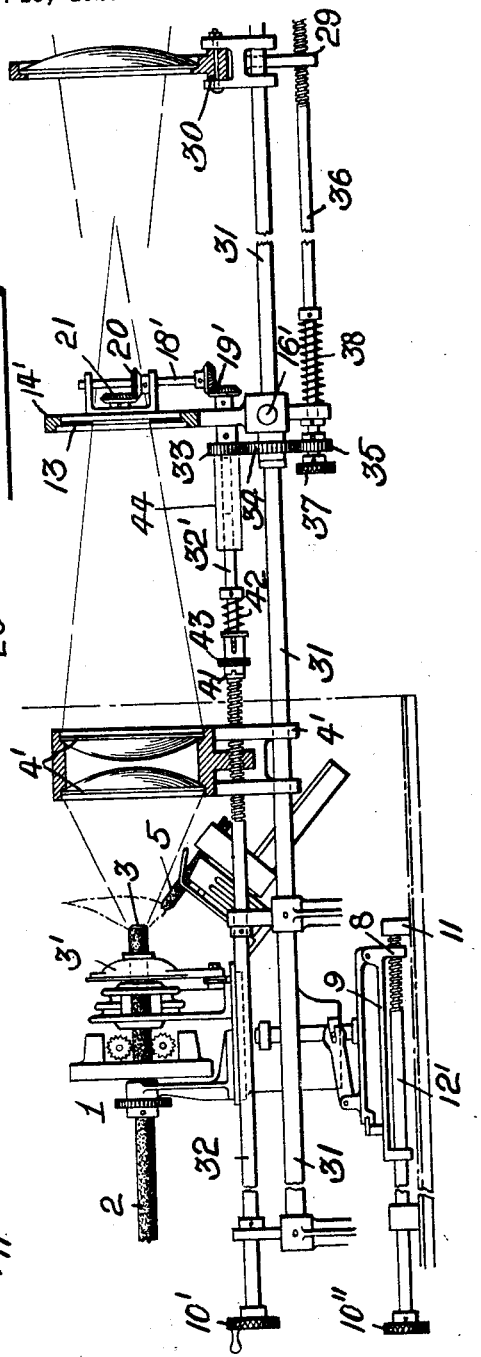
INVENTOR
Theodore Hall
BY
Herbert H. Thompson
ATTORNEY.

Nov. 13, 1928.

T. HALL 1,691,475

PROJECTOR LAMP

Filed Jan. 18, 1928

INVENTOR
Theodore Hall
BY
Herbert H. Thompson
his ATTORNEY

Patented Nov. 13, 1928.

1,691,475

UNITED STATES PATENT OFFICE.

THEODORE HALL, OF NEW YORK, N. Y., ASSIGNOR TO HALL & CONNOLLY, INC., OF NEW YORK, N. Y., A CORPORATION OF NEW YORK.

PROJECTOR LAMP.

Application filed January 18, 1928. Serial No. 247,527.

This invention relates to illuminating apparatus and has special reference to high intensity flaming arc light projection devices wherein a source of light is projected through a lens and provision is made for varying the projected light from a beam, or small spot-light, to a flood-light dispersion.

In this type of projecting device, employing the high intensity or other flaming arc, there is distortion of the beam spot or flood-light due to the long bright tail-flame and bright tip of the negative carbon being projected in addition to the desired projection of the real or main light source, i. e., the positive crater. The image of the arc tail-flame and that of the negative carbon tip are outside the true optical axis of the positive crater and the collector lens, and can, therefore, be interrupted at some point between the collector lens and the secondary or objective lens, by interposing a diaphragm and so designing the opening or aperture as to allow only the image of the positive crater, or some portion thereof to be transmitted.
But in order to vary the size of the projected beam it is necessary to vary the opening of the aperture of the diaphragm. Since this opening must be varied, the cone of light must also be adjusted so as to fill the largest diaphragm opening. Otherwise, when the opening is reduced, with the cross section of the cone remaining the same, the light projected through the objective lens is too greatly reduced for efficient operation.
One purpose of the invention is to devise an automatically operated arrangement which maintains the size of the light cone where it passes through the variable aperture in the shutter of the proper size to enable the maximum amount of light to be transmitted under all conditions and at the same time to cut out the aforesaid undesirable light from the tail flame and negative tip. This is accomplished preferably by making the light source and collector lens relatively adjustable toward and away from each other, and while keeping the position of the shutter fixed, automatically varying the size of the aperture as the beam's cross section as the shutter varies.

Another object of the invention is to provide for simultaneous adjustment of the position of the objective lens to obtain a greater range of spread than is now possible without changing lenses. Still further objects of the invention will be apparent as the description proceeds.

Referring to the drawings in which several preferred forms of my invention are shown:—

Fig. 1 is a side elevation, partly in section, of my projector lamp, the usual housing being largely omitted.

Fig. 2 is a corresponding view of another form of projector lamp.

Figure 3:
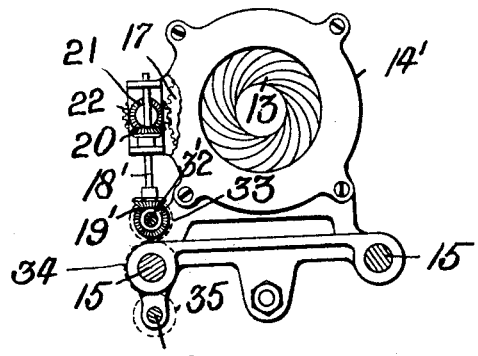
Fig. 3 is a vertical section taken approximately on line 3—3 of Fig. 2.

In the drawings, an arc lamp mechanism, preferably of the high intensity flaming arc type, is shown generally at 1, the positive electrode 2 being shown as supported for rotation and forward feeding within the holder 3 with its crater 3' containing the principal light source facing the collector lenses 4 or other form of condenser. The negative electrode 5 is shown positioned at an angle with its tip below the principal cone of light. That portion of the flame outside of the ball of light at the positive crater may be referred to generally as the tail flame and is of relatively low intrinsic brilliancy, but appears inverted in the beam unless cut out by a screen.

In this form of the invention, the collector and screen are made stationary and the light source moved to change the beam spread. As shown the collector lenses are mounted at the front of the lamp housing 6, while the lamp mechanism is slidably mounted on a rod or rods 7, one foot 8 of the base 9 thereof being threaded on the rod so that rotation of the rod by thumb piece 10 adjusts the arc back and forth as desired. Said rod is shown as journaled in a lug or lugs 11 on the lamp housing and has an extension 12 projecting beyond the lamp housing to the screen 13.

Said screen is shown as in the form of an iris shutter mounted in frame-work 14 adjustably clamped on parallel rods 15 but normally locked in position by set screw 16. Adjustment of the size of the aperture in the shutter is secured in the usual manner by the rotation of annular gear 17 (Fig. 3) and this is accomplished automatically when the light source is adjusted by a drive connection between shaft 12 and said gear. As shown, this may comprise a vertical shaft 18 having a bevel gear connection 19 with squared sleeve 44' on shaft 12, and having an extension carrying a second pair of bevel gears 20 and 21, the latter driving spur gear 22 meshing with gear 17. The arrangement is such that the largest opening of the shutter occurs when the lamp is nearest the collector lens, so that the greatest possible amount of light is collected when most needed, i. e., when the beam is spread to a maximum. It is also undesirable to have the beam when contracted to a spot too intense and this condition is avoided by having the lamp furthest away from lens 4 when the opening in the shutter is smallest.

Preferably means are provided for disengaging gears 19, so that the iris shutter can be adjusted independently of the light source for internal setting and the like. For this purpose, I have shown shaft 18 as divided into two parts with a bayonet slot and pin connection 25. When the operator desires to so adjust the shutter he first pushes up thumb piece 26, thus compressing spring 27 and disengaging the gears and then turns said thumb piece to rotate the shaft 18. When released by the operator, spring 27 returns the gears into mesh.

I also show means for adjusting the position of the objective lens 40, since this is highly desirable if the maximum beam spread is to be obtained without changing lenses. In Fig. 1, a hand adjustment is shown for this purpose comprising a shaft 28 journaled at 29' in bracket 14 and having its outer end threaded in a lug 29 extending downwardly from the carriage 30 for the lens, said carriage being slidably mounted on rods 15.

In Fig. 2, the relative adjustment of the light source and collector lens is secured by adjusting the lens and providing a connection between it and the shutter. The lens carriage 4' is slidably mounted on rods 31 and threaded on a rotatable rod 32. Said rod has a driving connection with bevel gears 19' which adjust through shaft 18' and gears 20, 21 the iris shutter 13.

Figure 4:
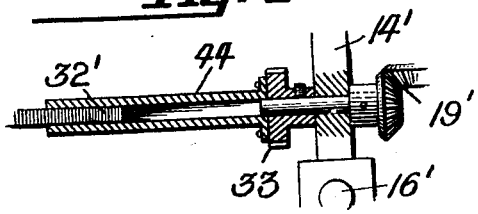
Fig. 4 is a detail section showing the slidable torque transmitting connection between the shafts used for transmitting the adjustments.

For independent adjustment of the lens and shutter, I have shown shaft 32 as divided into two parts 32 and 32', normally connected by a coupling 41, the two parts of the coupling being normally pressed together by spring 42. When independent adjustment is desired, the operator grabs the thumb piece 43 and pushes forwardly on the same to compress the spring and detach the coupling. He then either turns the thumb piece 43 or the handle 10' as desired. There is also shown a slip coupling on the shaft 32' with the gear 33 to permit adjustment of the carriage 14' of the shutter. This connection is shown in detail in Fig. 4, shaft 32' being squared and gear 33 having a squared sleeve 44 thereon which slidably but non-rotatably fits on the shaft.

In this form also, I have shown automatic means for adjusting the position of the objective with changes in the beam. From shaft 32 as by gears 33, 34 and 35 I drive a shaft 36, which like shaft 28, has its end threaded in the lens bracket 30. By this means the objective lens is also positioned automatically in the proper position to obtain the maximum amount of light on the scene for different beam spreads and without the necessity for changing lenses or separately adjusting by hand the position of the objective. For independently adjusting the lens, the operator first pulls knob 37 rearwardly to compress spring 38 and disengage gears 34 and 35 and then turns the knob. In this form also the arc mechanism may be adjusted, if desired, by having the base 9 thereof threaded on the shaft 12' having knob 10'' but this is ordinarily not touched during a performance when quick adjustments are secured by means of the handle 10'. If desired, I may also provide a shield or enclosure for the cone of light between the collector and shutter to further cut out stray light. Such a shield is shown in Fig. 1 as comprising a pair of telescoping truncated hollow cones 45 and 46, one secured to housing 6 and the other to frame 14.

By my invention it is possible to change quickly from a concentrated spot light to a full flood light while retaining the desired amount of illumination on the scene and at the same time to cut out under all conditions the objectionable tail flame and negative electrode shadow or image.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaming arc projector lamp, an arc lamp mechanism, a beam collector, an objective lens, a shutter adjustable to various size apertures positioned in the beam, means for changing the relative position of the arc and said collector, and means interconnecting said first-named means and said shutter for adjusting the size of the aperture in said shutter accordingly.

2. In a flaming arc projector lamp, an arc lamp mechanism, a beam collector, an objective lens, a shutter adjustable to various size apertures positioned in the beam, means for changing the relative position of the arc and said collector, means interconnecting said first-named means and said shutter for adjusting the size of the aperture in said shutter accordingly, and additional means for independently adjusting the size of said aperture.

3. In a flaming arc projector lamp, an arc lamp mechanism, a beam collector, an objective lens, a shutter adjustable to various size apertures positioned in the beam, means for changing the relative position of the arc and said collector, and means interconnecting said first-named means and said shutter for adjusting the size of the aperture in said shutter and for varying the relative position of said objective lens.

4. In a flaming arc projector lamp, an arc lamp mechanism, a beam collector, an objective lens, a shutter adjustable to various size apertures positioned in the beam, means for changing the relative position of the arc and said collector, means interconnecting said first-named means and said shutter for adjusting the size of the aperture in said shutter accordingly, additional means for independently adjusting the size of said aperture, and means for varying the relative position of said objective lens.

5. In a projector lamp, an arc lamp mechanism, a collector lens, means for adjustably mounting said lens, an objective lens, an iris shutter or the like between said lenses, means for adjustably mounting said objective lens, and means interconnecting said lenses and shutter to adjust all simultaneously.

6. In a flaming arc projector lamp, an arc lamp mechanism, a beam collector, an objective lens, a shutter adjustable to various size apertures positioned between said collector and lens, means for changing the relative position of the arc and said collector, means interconnecting said first-named means and said shutter for adjusting the size of the aperture in said shutter accordingly, and a telescopic shield for enclosing the beam between said collector and shutter.

7. In a projector lamp, an arc lamp mechanism, a collector lens, means for adjustably mounting said lens, an objective lens, an iris shutter or the like between said lenses, means for adjustably mounting said objective lens, means interconnecting said lenses and shutter to adjust all simultaneously, and means for also adjusting said lenses and shutter independently.

8. In a flaming arc projector lamp, an arc lamp mechanism, a beam collector, an objective lens, a shutter adjustable to various size apertures positioned in the beam, means for changing the relative position of the arc and said collector, means interconnecting said first-named means and said shutter for adjusting the size of the aperture in said shutter in accordance with the divergence of the beam, and means for also adjusting the relative position of said objective lens.

9. In a projector lamp, the combination with an adjustably mounted source of light, an adjustably mounted collector, a shutter with a variable size aperture and an adjustably mounted objective, of means interconnecting said collector, shutter and objective whereby the size of the aperture in the shutter and the position of the objective are automatically adjusted with adjustment of said collector.

In testimony whereof I have affixed my signature.

THEODORE HALL.